United States Patent [19]
Takahashi

[11] Patent Number: 6,042,939
[45] Date of Patent: Mar. 28, 2000

[54] MAGNETIC RECORDING MEDIUM AND METHOD OF MANUFACTURING THE SAME

[76] Inventor: Migaku Takahashi, 20-2, Hitokida 2-chome, Taihaku-ku, Sendai-shi, Miyagi-ken, 980, Japan

[21] Appl. No.: 08/913,032
[22] PCT Filed: Mar. 8, 1995
[86] PCT No.: PCT/JP95/00381
  § 371 Date: Oct. 20, 1997
  § 102(e) Date: Oct. 20, 1997
[87] PCT Pub. No.: WO96/27878
  PCT Pub. Date: Sep. 12, 1996
[51] Int. Cl.[7] .................................................. G11B 5/66
[52] U.S. Cl. ...................... 428/332; 428/336; 428/694 T; 428/694 TS; 428/900; 427/128; 427/129; 427/130
[58] Field of Search .......................... 428/694 T, 694 TS, 428/332, 336, 900; 427/128–130

[56] References Cited

U.S. PATENT DOCUMENTS

| | | | |
|---|---|---|---|
| 5,153,044 | 10/1992 | Chen | 428/64.2 |
| 5,302,434 | 4/1994 | Doerner | 428/64.2 |
| 5,405,646 | 4/1995 | Nanis | 427/131 |
| 5,436,047 | 7/1995 | Howard | 428/64.2 |
| 5,480,733 | 1/1996 | Okumura | 428/694 T |
| 5,631,094 | 5/1997 | Ranjan | 428/611 |

FOREIGN PATENT DOCUMENTS

| | | |
|---|---|---|
| 52-135704 | 11/1977 | Japan . |
| 57-94927 | 6/1982 | Japan . |
| 62-117143 | 5/1987 | Japan . |
| 63-21752 | 9/1988 | Japan . |
| 5-120664 | 5/1993 | Japan . |

*Primary Examiner*—Leszek Kiliman
*Attorney, Agent, or Firm*—Randall J. Knuth

[57] ABSTRACT

A magnetic recording medium having a large coercive force independent of the material of the substrate body by employing an α-rich layer and a β-rich layer. The magnetic recording medium, using magnetic inversion, comprises a substrate body and a ferromagnetic Co-alloy layer on the surface of the substrate body. Between the substrate body and the magnetic layer may be interposed a Cr-containing metallic base layer. The base layer and/or the ferromagnetic alloy layer has an oxygen concentration of not more than 100 wt ppm. An α-rich layer of nickel, phosphorus, and the oxides thereof, and a β-rich layer containing an ester group are provided between the substrate body and the base layer or the ferromagnetic alloy layer. In the manufacturing process according to the present invention, the α-rich layer, a β-rich layer, metal base layer, and ferromagnetic metallic layer are formed at pressure below the order of $10^{-9}$ Torr.

12 Claims, 11 Drawing Sheets

(a)

(b)

(a)

(b)

$t\alpha + t\beta$ (nm)

(a)

(b)

MAGNETIC RECORDING MEDIUM AND METHOD OF MANUFACTURING THE SAME

BACKGROUND OF THE INVENTION

1. Field of the invention.

The present invention relates to a magnetic recording medium having a high coercive force and a method of manufacturing the medium. The magnetic recording medium in accordance with the present invention is suitably used for hard disks, floppy disks, magnetic tape, and other applications.

2. Description of the related art.

In a conventional magnetic recording medium and method of manufacturing the medium, there is known a technique which follows.

FIG. 11 schematically shows an example of a magnetic recording medium for explaining a hard disk. In the drawing, FIG. 11(a) is a perspective view of an entire magnetic recording medium and FIG. 11(b) is a cross-sectional view of a part of the medium of FIG. 11(a) taken along line A–A'.

A substrate body 1 is made up of an Al substrate body 2 and a non-magnetic (Ni-P) layer 3 formed on the Al substrate body 2. Formed on the substrate body 1 are a Cr base layer 4, a ferromagnetic metallic layer 5, and a protective layer 6.

The non-magnetic (Ni-P) layer 3 is formed by a plating or sputtering process on the Al substrate body 2 having a disk shape having a diameter of 89 mm (3.5 inches) and a thickness of 1.27 mm (50 mil) to form a part of the substrate body 1. The non-magnetic (Ni-P) layer 3 is formed thereon with concentric circular scars (which will be referred to as texture hereinafter) by a mechanical polishing process. In general, the non-magnetic (Ni-P) layer 3 has a surface roughness, that is, an average roughness factor when measured in its radial direction, of 5 to 15 nm. Further, the Cr base layer 4 and ferromagnetic metallic layer 5 (usually, Co alloy magnetic film) are formed on the substrate body 1 by a sputtering process, and finally the protective layer 6 made of carbon, or the like, for protecting a surface of the ferromagnetic metallic layer 5 is provided on the layer 5 by a sputtering process. With respect to the respective layers, the non-magnetic (Ni-P) layer 3 has a typical thickness of 5 to 15 m, the Cr base layer 4 has a typical thickness of 50 to 150 nm, the ferromagnetic metallic layer 5 has a typical thickness of 30 nm to 100 nm, and the protective layer 6 has a typical thickness of 20 to 50 nm.

The prior art magnetic recording medium having the aforementioned layer structure was manufactured under conditions of vacuum pressure in a film formation chamber of $10^{-7}$ Torr before formation of the sputtered film and an impurity concentration in an Ar gas used for the film formation of 1 ppm or more.

When it is desired to fabricate a magnetic recording medium having a high coercive force with use of the aforementioned fabrication method, there has been widely used such a technique that Pt elements are contained in a Co alloy magnetic film as the ferromagnetic metallic layer. The Co alloy magnetic film containing Pt elements is advantageous in that the film can easily be manufactured stably on a mass production basis into media having a high coercive force but also disadvantageous in that the film has problems which follow when compared with a Co alloy magnetic film not containing Pt elements, e.g., a CoCrTa film.

(1) The film is high in fabrication costs.

(2) The film is high in media noise of electromagnetic conversion characteristics and thus tends to have a low signal-to-noise ratio.

In order to solve such problems, there is disclosed such a technique as disclosed in an International Patent Application PCT/JP94/01184 Publication. Disclosed in the Publication are high-density recording medium which can increase a coercive force without using an expensive ferromagnetic metallic layer as well as a method of manufacturing the medium. Also disclosed in the Publication is a technique wherein, in the magnetic recording medium using magnetic inversion which comprises of such a medium.

SUMMARY OF THE INVENTION

The present invention provides a magnetic recording medium using magnetic inversion which comprises a ferromagnetic metallic layer made of a Co alloy formed on a surface of the substrate body at least through a metallic underlayer made of Cr. The metallic underlayer and/or ferromagnetic metallic layer has an oxygen concentration of 100 wt. ppm or less, characterized in the an α-rich layer of at least Nickel (Ni), phosphorus (P), and oxides thereof and a β-rich layer having at least an ester group are provided substrate body and a ferromagnetic metallic layer formed thereon through a metallic underlayer, an oxygen concentration in the metallic underlayer and/or ferromagnetic metallic layer is set at 100 wt ppm or less by setting at 10 ppb or less an impurity concentration in an Ar gas used for film formation. Also reported is such a technique that, prior to the formation of the above metallic underlayer, the substrate body is subjected thereon to an RF sputtering process with use of an Ar gas containing an impurity concentration of 10 ppb or less to clean or remove the surface of the substrate body by a depth of 0.2 nm to 1 nm to further increase the coercive force.

However, for the purpose of realizing a high recording density of magnetic recording medium, it is necessary to realize higher frequency recording. In this case, the number of times of magnetic inversion per unit length tends to be higher. That is, a bit length corresponding to one bit is shorter. Further, it is also necessary to make a track width small, which results in that an area for recording of one bit has to be made smaller.

A reduction in the bit area leads to a tendency of more influence by a transition region of the magnetic inversion.

Accordingly, there have been demanded magnetic recording medium which can have a high coercive force to realize a magnetization pattern having a large anti-magnetizing force even for a small bit area as well as a method of manufacturing between said substrate body and said metallic underlayer. Further, the above magnetic recording medium is characterized by having such a layer structure of a substrate body, an α-rich layer, a β-rich layer, a metallic underlayer, and a ferromagnetic layer.

The magnetic recording medium of one form of the present invention comprises a ferromagnetic metallic layer made of Co alloy formed on a surface of the substrate body, the ferromagnetic metallic layer having an oxygen concentration of 100 wt. ppm or less, having an α-rich layer of at least nickel (Ni), phosphorus (P), and oxides thereof and a β-rich layer having at least an ester group provided between the substrate body and the ferromagnetic metallic layer. The magnetic recording medium is characterized by having a layer structure of the substrate body, α-rich layer, β-rich layer, and ferromagnetic metallic layer.

Further, it is desirable that a sum $(t\alpha+t\beta)$ of a thickness $t\alpha$ of the α-rich layer and a thickness $t\beta$ of the β-rich layer satisfy a relationship of 3 nm$\leq(t\alpha+t\beta)\leq$12 nm; and it is preferable that a ratio $(t\alpha/t\beta)$ of a thickness $t\alpha$ of the α-rich layer to a thickness $t\beta$ of the β-rich layer satisfy a relationship of $0<(t\alpha/t\beta)\leq1$.

Furthermore, the β-rich layer having the ester group consists of organic molecules having a melting point higher than a temperature of the substrate body at which the metallic underlayer and ferromagnetic metallic layer are formed.

A method of manufacturing a magnetic recording medium in accordance with the present invention is characterized in that vacuum pressure levels of film formation chambers for formation of the α-rich layer, β-rich layer, metallic underlayer, and ferromagnetic metallic layer are on the order of $10^{-9}$ Torr or less.

The method of manufacturing a magnetic recording medium in accordance with the present invention is further characterized in that the substrate body temperature at which the metallic underlayer and/or ferromagnetic metallic layer is formed is lower than a melting point of organic molecules of the β-rich layer.

In accordance with one form of the invention, since an α-rich layer of at least nickel (Ni), phosphorus (P), and oxides thereof and a β-rich layer having at least an ester group are provided between the substrate body and the metallic underlayer the crystallographic orientations of the Cr metallic underlayer and Co alloy ferromagnetic metallic layer can be oriented randomly. As a result, the coercive force in the substrate body in-plane direction can be made high.

The invention, in another form thereof, includes a magnetic recording medium having a layer structure of the substrate body, α-rich layer, β-rich layer, metallic underlayer, and ferromagnetic metallic layer. The uniform α-rich layer can be formed on the substrate body, and the uniform β-rich layer can be formed on the α-rich layer. As a result, local missing of the β-rich layer and β-rich layer can be minimized and variations in the coercive force in the substrate body in-plane direction can be made small. Accordingly, there can be obtained a magnetic recording medium which is suitable for stable longitudinal magnetic recording.

In accordance with another form of the invention, since an α-rich layer of at least nickel (Ni), phosphorus (P), and oxides thereof and a β-rich layer having at least an ester group are provided between the substrate body and the ferromagnetic metallic layer, the crystallographic orientation of the Co alloy ferromagnetic metallic layer can be oriented randomly. As a result, the coercive force in the substrate body vertical direction can be made high.

In accordance with yet another form of the invention, since the magnetic recording medium has a layer structure of the substrate body, α-rich layer, β-rich layer, and ferromagnetic metallic layer, the uniform α-rich layer can be formed on the substrate body and the uniform β-rich layer can be formed on the α-rich layer. As a result, local missing of the α-rich layer and the β-rich layer can be minimized and variations in the coercive force in the substrate body vertical direction can be made small. Accordingly, there can be obtained a magnetic recording medium which is suitable for stable vertical magnetic recording.

In accordance with still another form of the invention, since a sum $(t\alpha+t\beta)$ of a thickness $t\alpha$ of the α-rich layer and a thickness $t\beta$ of the β-rich layer satisfies a relationship of 3 nm$\leq(t\alpha+t\beta)\leq$12 nm, there can be obtained a magnetic recording medium which has a coercive force of 2000 Oe or more.

In accordance with another form of the invention, since the β-rich layer having an ester group consisting of organic molecules having a melting point higher than a temperature of the substrate body at which the metallic underlayer and ferromagnetic metallic layer are formed, the β-rich layer having the ester group can be prevented from peeling off therefrom. As a result, the metallic underlayer and ferromagnetic metallic layer can be formed with their stable crystallographic oriented faces.

In accordance with still another form of the invention, since vacuum pressure levels of film formation chambers for formation of the α-rich layer, β-rich layer, metallic underlayer, and ferromagnetic metallic layer are on the order of $10^{-9}$ Torr or less, an interface between the substrate body, α-rich layer, and an interface between the respective layers can be kept clean. As a result, the crystallographic orientation of the metallic layer can be stably controlled.

In accordance with yet another form of the invention, since the substrate body temperature at which the metallic underlayer and/or ferromagnetic metallic layer is formed is lower than a melting point of organic molecules of the β-rich layer, the solid-state β-rich layer can be prevented from being released therefrom for decomposition at the time of forming the metallic underlayer and/or ferromagnetic metallic layer.

BRIEF DESCRIPTION OF THE DRAWINGS

It is a first object of the present invention to provide a magnetic recording medium using magnetic inversion which comprises a ferromagnetic metallic layer made of Co alloy formed on a surface of the substrate body through or not through a metallic underlayer made of Cr and the metallic underlayer and/or ferromagnetic metallic layer has an oxygen concentration of 100 wt. ppm or less, and wherein an α-rich layer and a β-rich layer are employed to stably provide a high coercive force independently of a material of the substrate body.

A second object of the present invention is to provide a method of manufacturing a magnetic recording medium in which a ferromagnetic metallic layer having a high coercive force can be formed by stably forming an α-rich layer and a β-rich layer.

Figure 1:
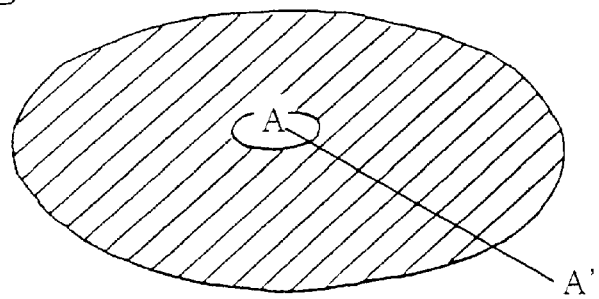
Figure 1:
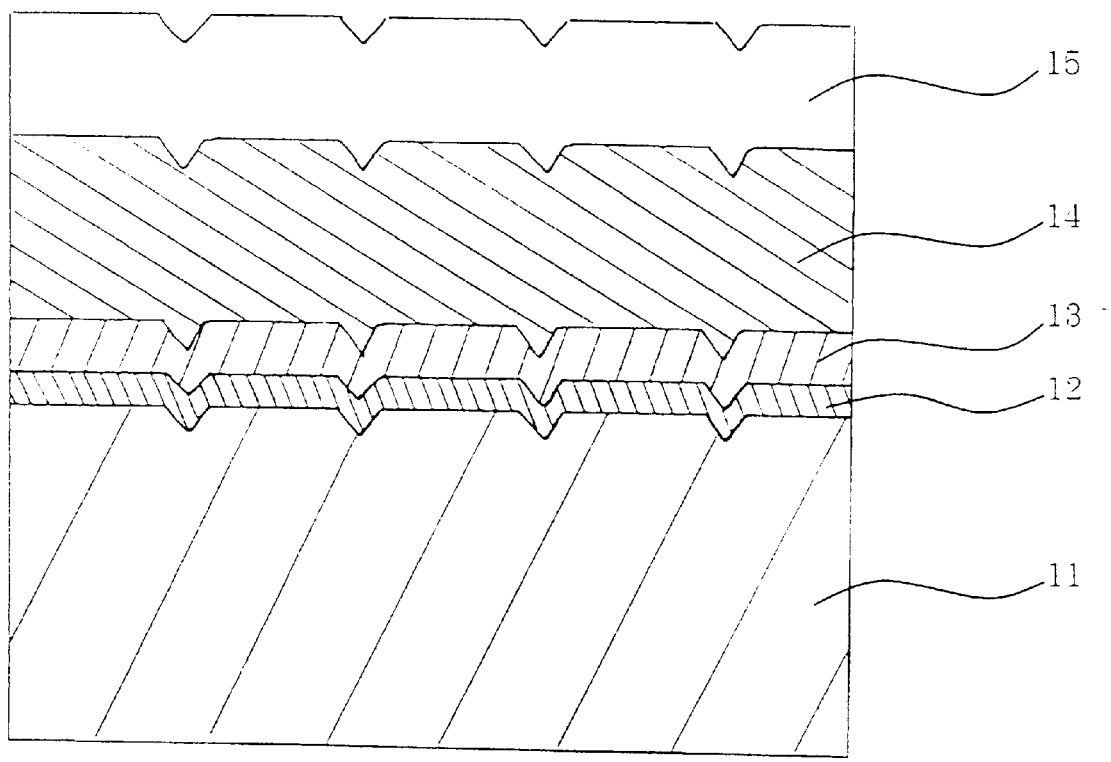
Figure 2:
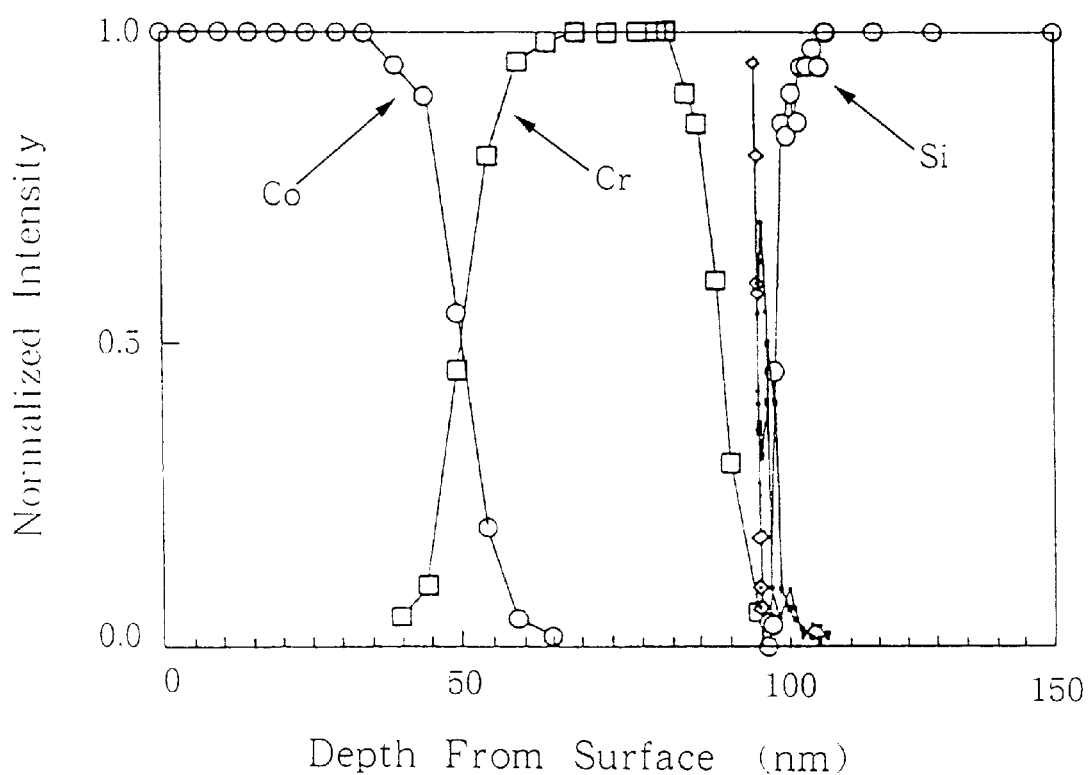
Figure 3:
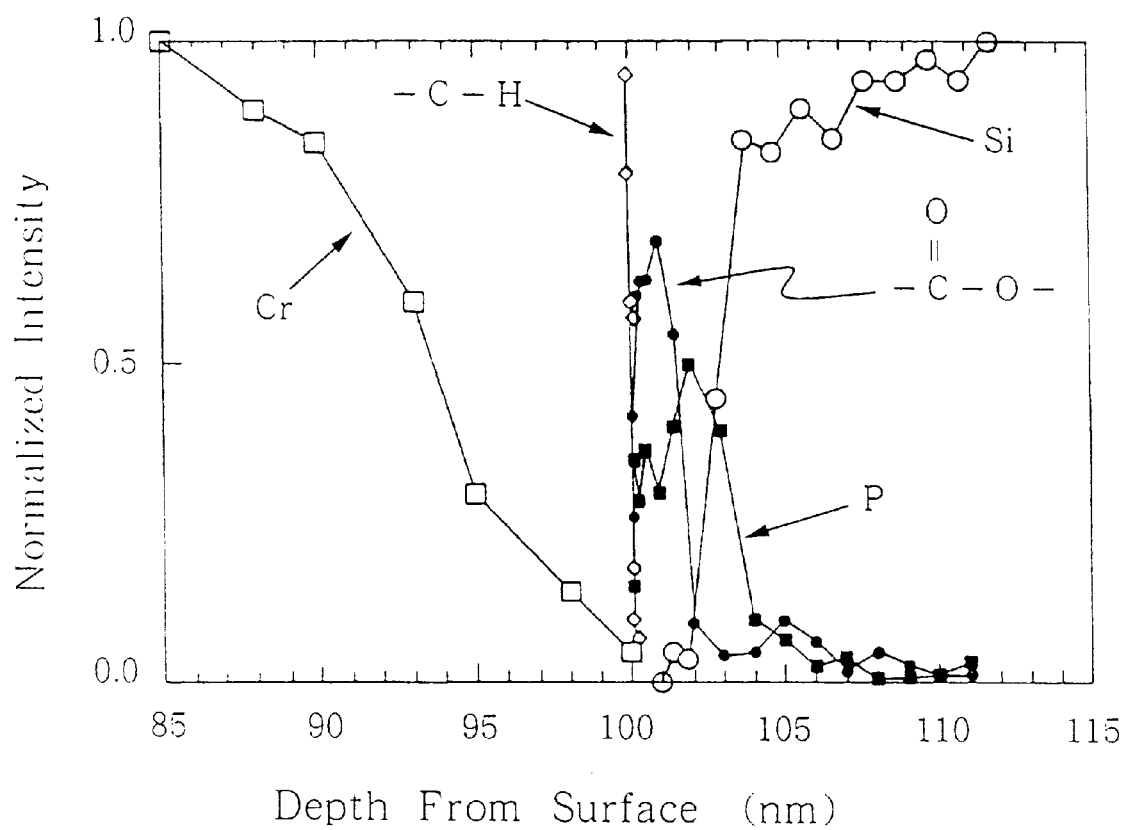
Figure 4:
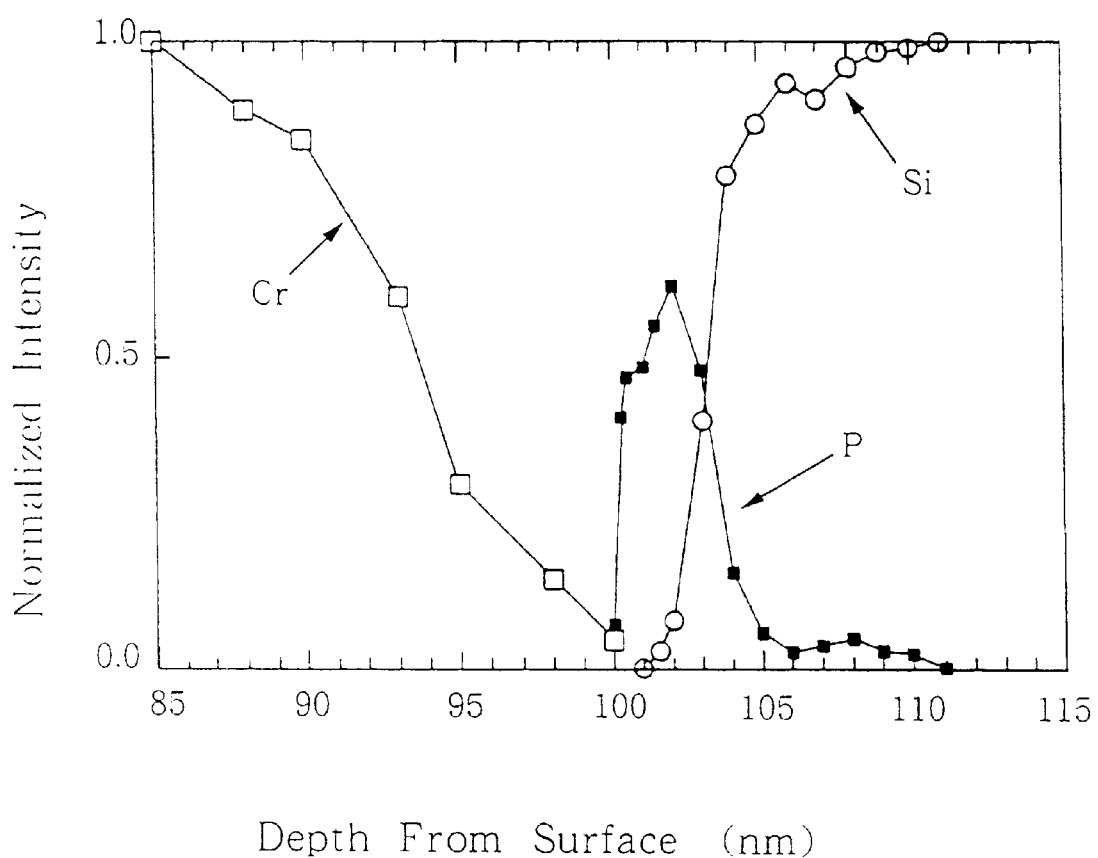
Figure 5:
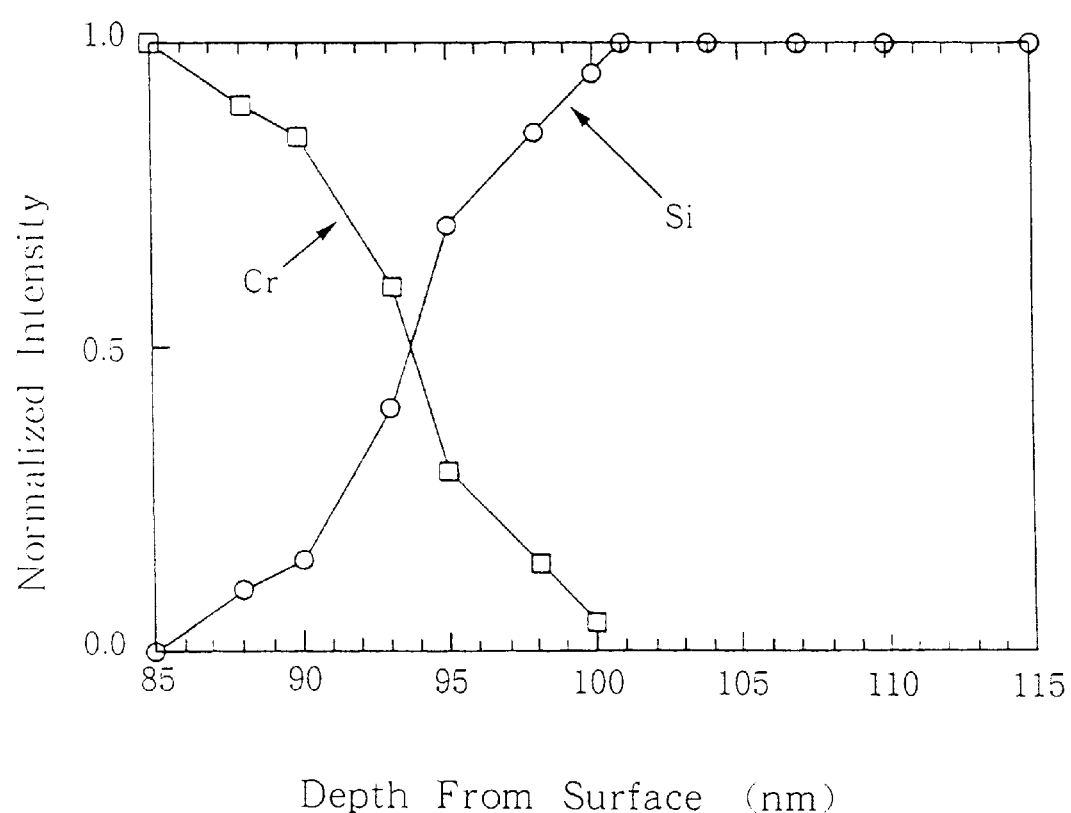
Figure 6:
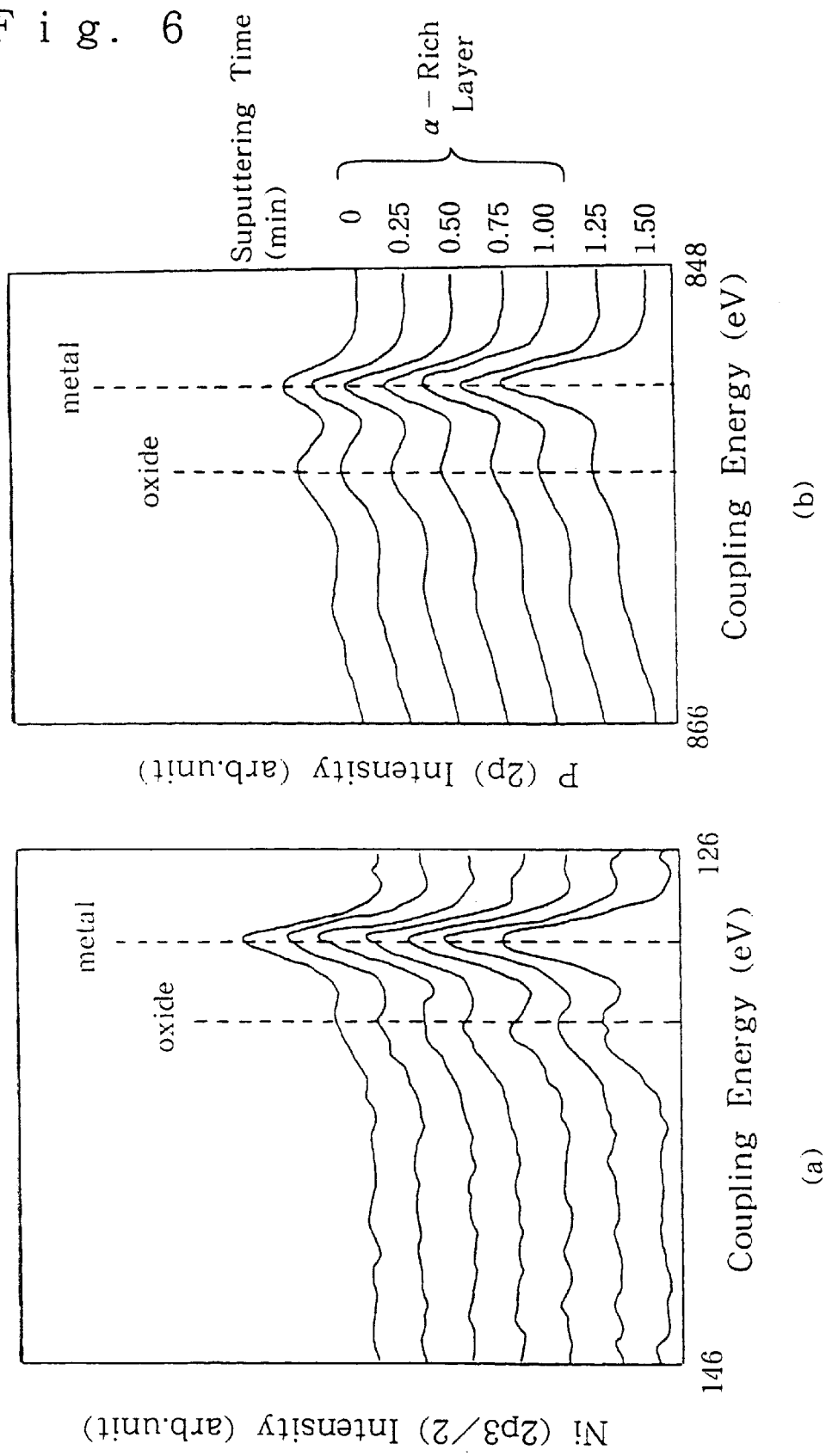
Figure 7:
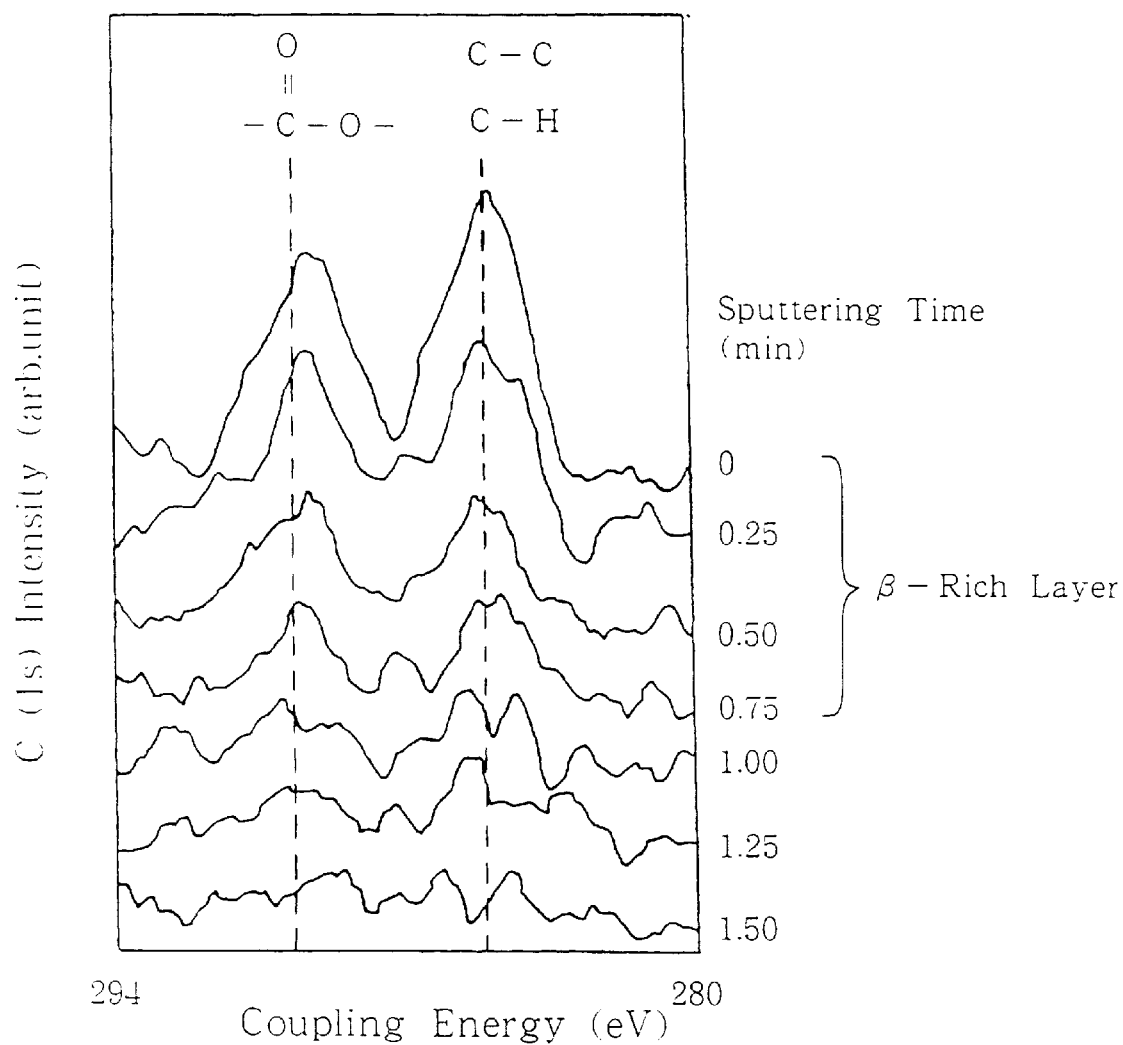
Figure 8:
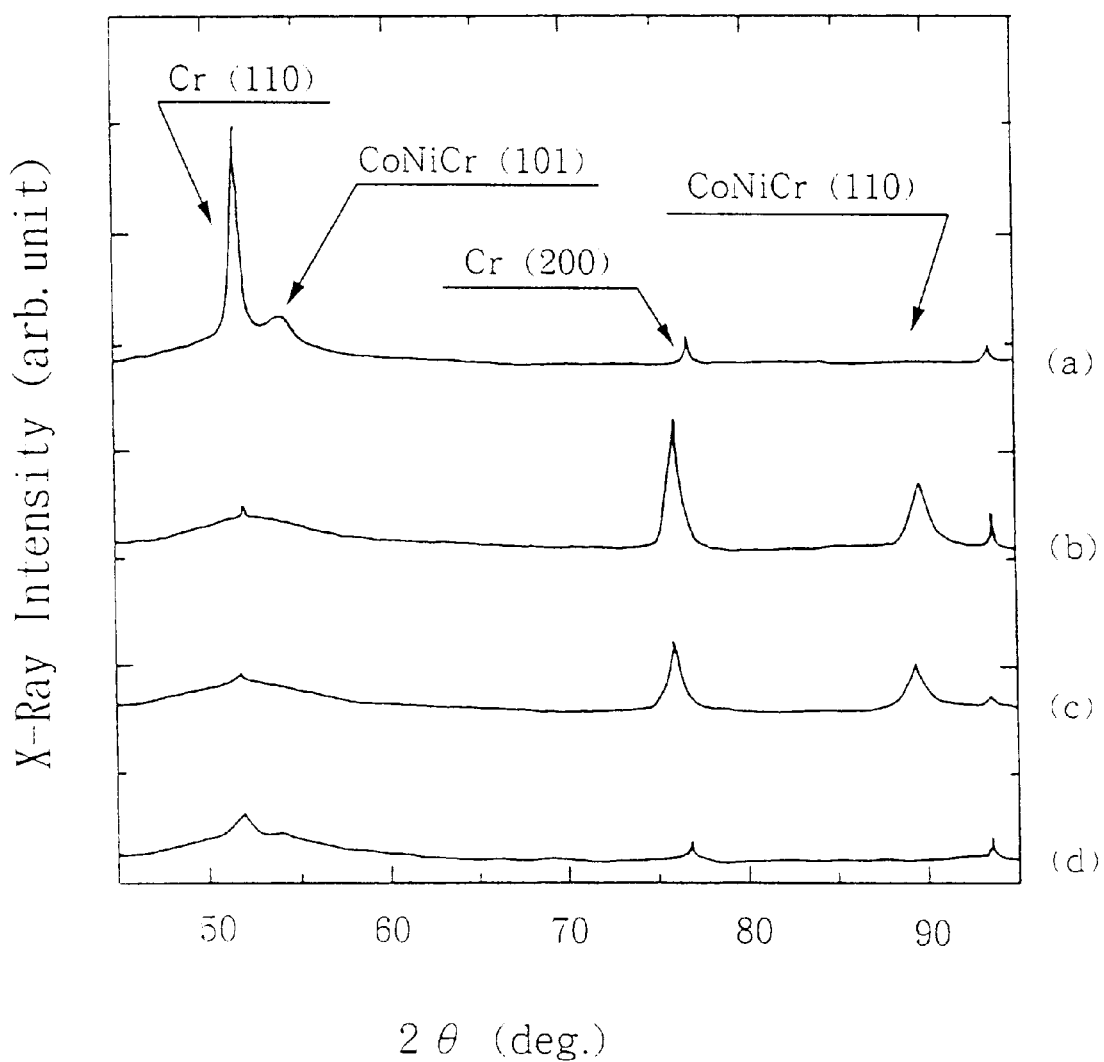
Figure 9:
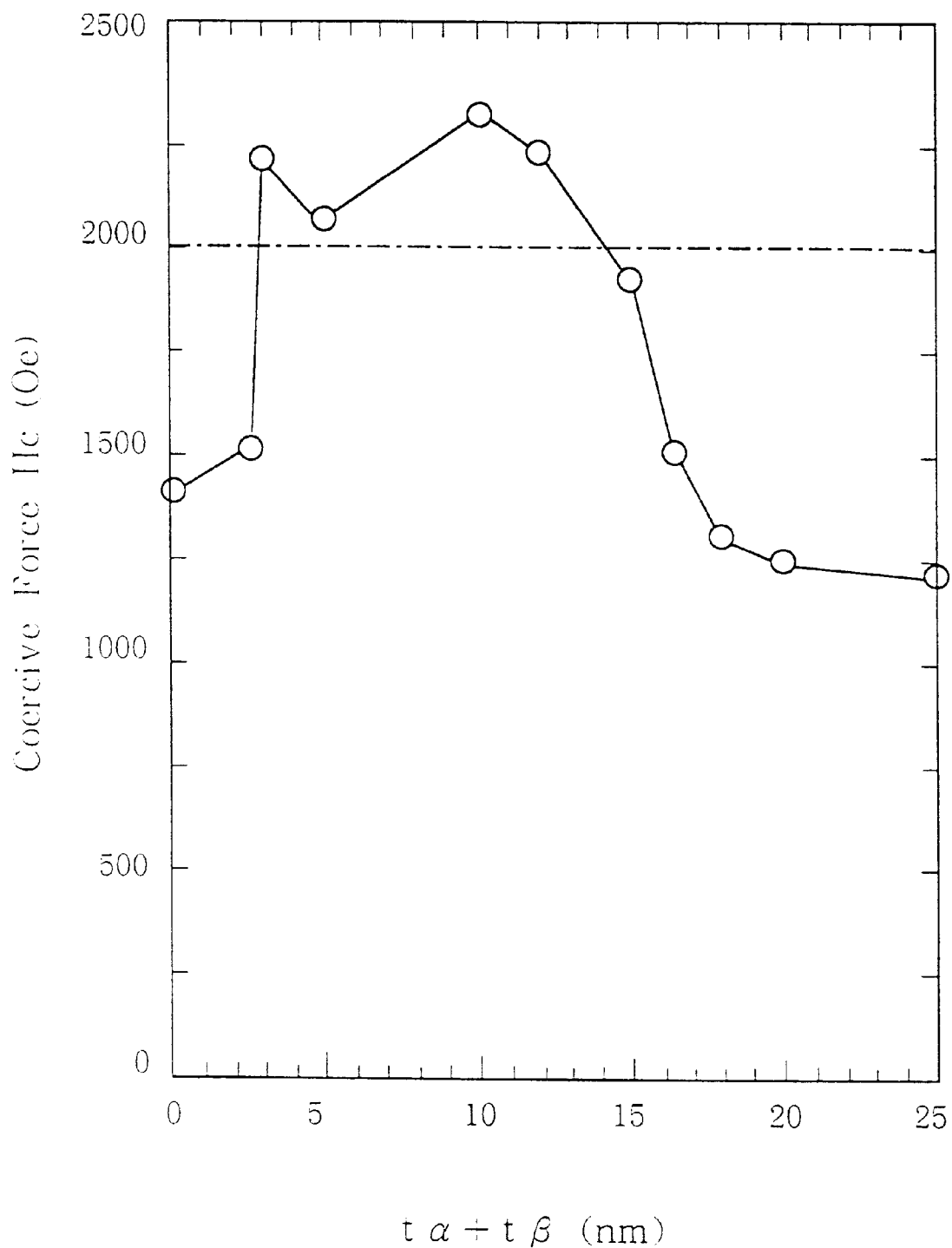
Figure 10:
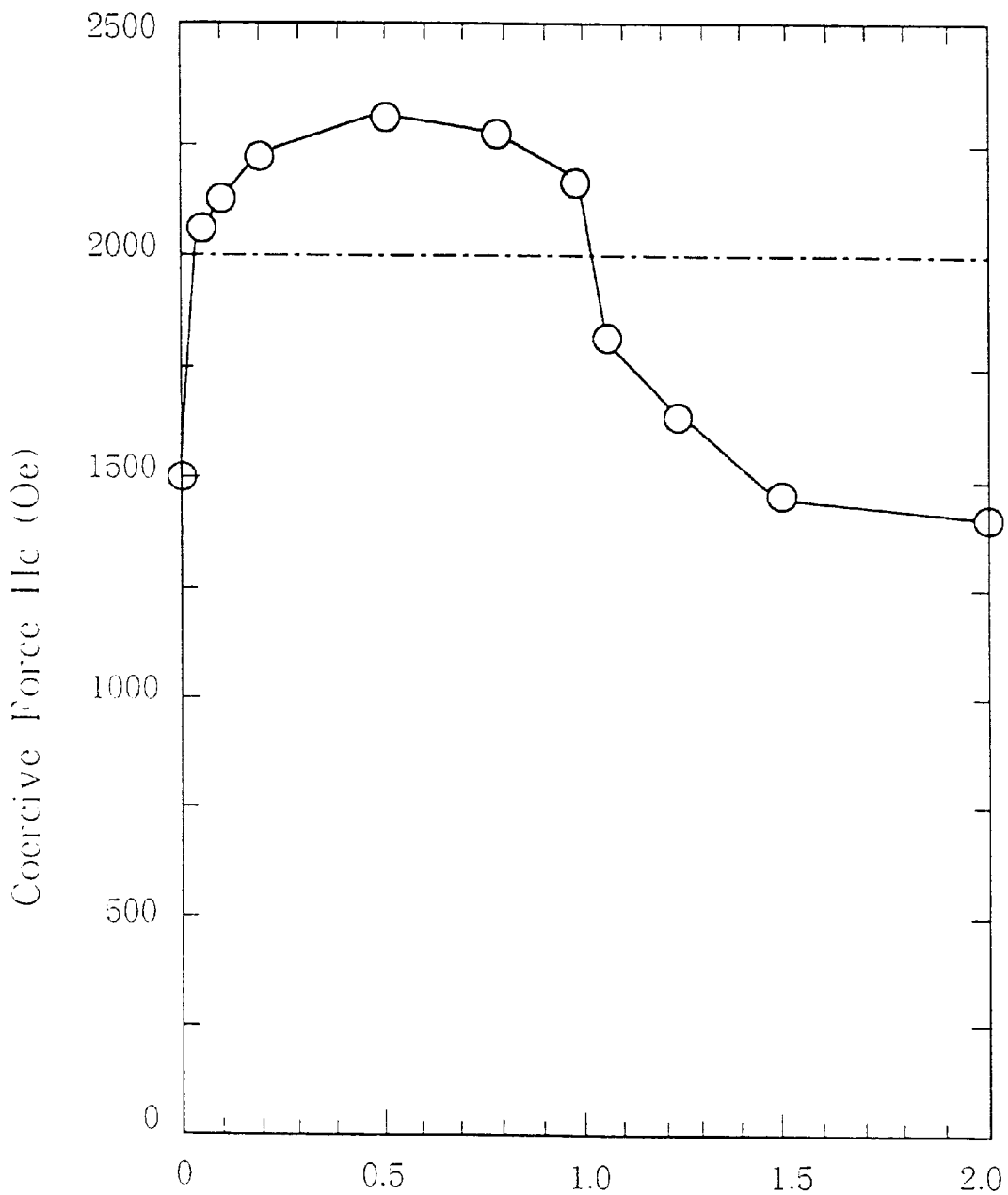
Figure 11:
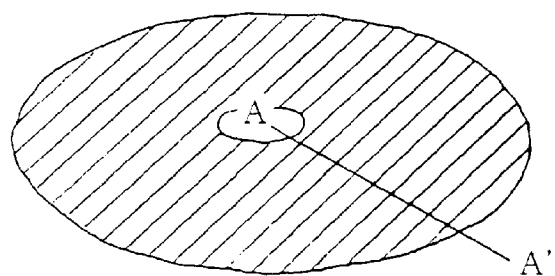
Figure 11:
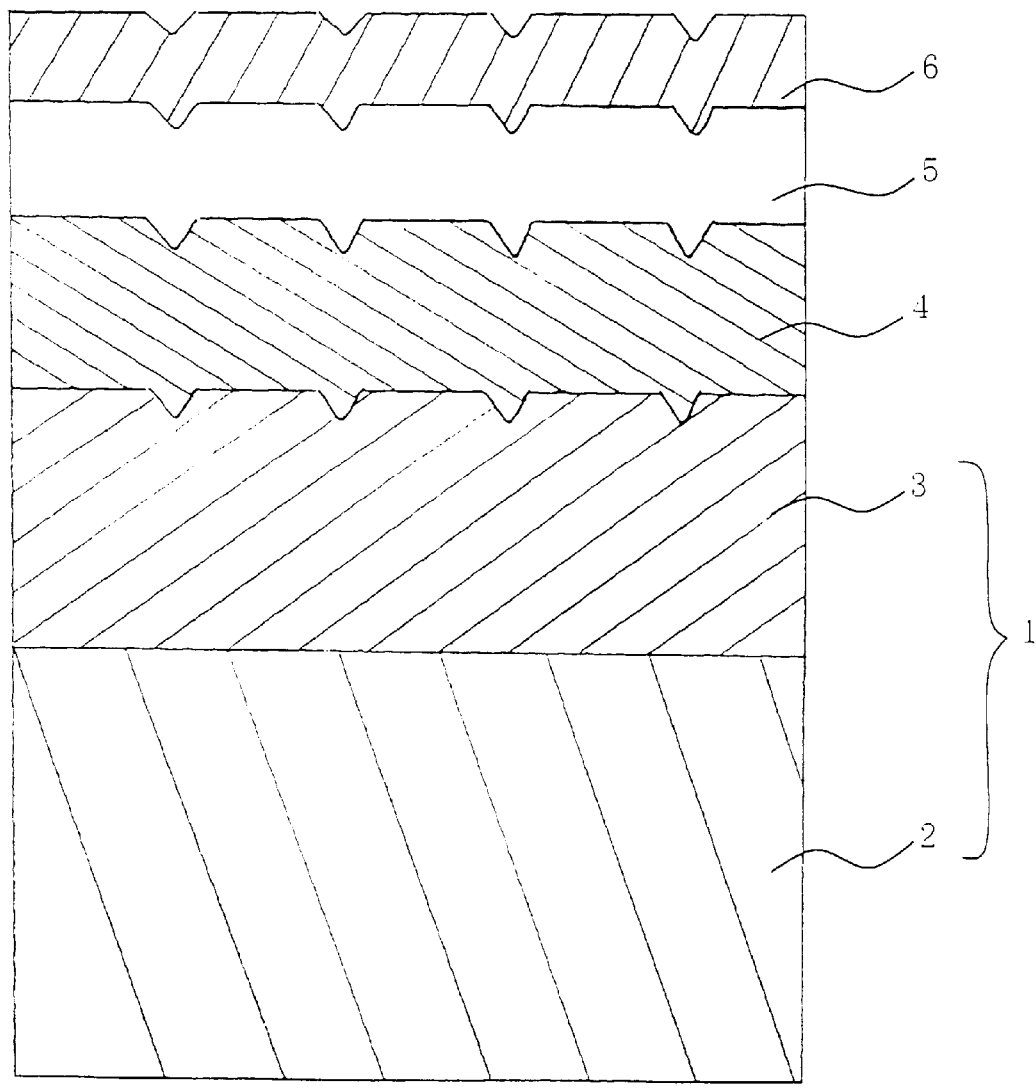

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a schematic view of a magnetic recording medium in accordance with the present invention;

FIG. 2 is a graph showing results of compositions of a magnetic recording medium which is made under condition 3 in embodiment 1 and which is analyzed in a cross-sectional direction of stacked thin films;

FIG. 3 is an enlarged view of FIG. 2 in the vicinity of an α-rich layer and a β-rich layer stack in FIG. 2;

FIG. 4 is a graph showing results of compositions of a magnetic recording medium which is made under condition 2 in embodiment 1, and which is analyzed in the cross-sectional direction of the stacked thin films;

FIG. 5 is a graph showing results of compositions of a magnetic recording medium which is made under condition 1 in embodiment 1, and which is analyzed in the cross-sectional direction of the stacked thin films;

FIGS. 6(a and b) are graphs showing measured results of diffraction intensity of Ni (2p3/2) and P(2P) in the α-rich layer shown in FIG. 3;

FIG. 7 is a graph showing measured results of diffraction intensity of C (ls) in the β-rich layer shown in FIG. 3;

FIG. 8 is a graph showing results of examination of the magnetic recording media made under conditions 1 to 4 in the embodiment 1 with use of a thin-film X-ray diffractometry;

FIG. 9 is a graph showing a relationship between a sum (tα+tβ) of a thickness tα of an α-rich layer and a thickness of tβ of a β-rich layer in accordance with embodiment 2, and a coercive force of a manufactured medium;

FIG. 10 is a graph showing a relationship between a ratio (tα/tβ) of thickness tα of an α-rich layer to a thickness of tβ of a β-rich layer in accordance with embodiment 3, and a coercive force of a manufactured medium; and FIG. 11 is a schematic view of a prior art magnetic recording medium.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

An embodiment modes of the present invention will be explained in the following.

Substrate body for use in the present invention include, for example, aluminum, titanium and an alloy thereof, silicon, glass, carbon, ceramic, plastic, resin and composite thereof, and also include such a substrate body coated thereon with nonmagnetic films of different sorts of materials by a sputtering, vacuum deposition, plating, or the like process. It is preferable that the nonmagnetic film formed on the substrate body is not magnetized at high temperatures, electrically conductive, easily machined, and has suitable surface hardnesses. The nonmagnetic film satisfying such conditions is preferably an (Ni-P) film made especially by the sputtering process.

When the substrate body is used for a disk, the substrate body is shaped into a doughnut form. The substrate body formed la thereon with a magnetic layer, etc. which will be explained later, that is, a magnetic recording medium is used to be rotated at the speed of, e.g., 3600 rpm in its magnetic recording and reproducing modes. At this time, a magnetic head flies about 0.1 µm high over the magnetic recording medium. Thus, it is necessary to properly control the surface flatness, parallelism of front rear surfaces, waviness in the circumferential direction, and surface roughness of the substrate body.

Further, when the substrate body is rotated or stopped, the magnetic recording medium and magnetic head are brought into contact with each other (which is called contact start and stop or CSS operation). To avoid this, the substrate body may be, in some cases, formed on its surface with concentric circular fine scars (texture).

The metallic underlayer for use in the present invention is made of, e.g., Cr. Ti, W or alloys thereof. When the metallic underlayer is made of an alloy, the alloy is suggested to be made up of, e.g., a combination of V, Nb, Ta, and so on. In particular, Cr is preferable because it causes a segregating action to a ferromagnetic metallic layer (which will be explained later). Further, Cr is frequently used on a mass production basis and its film forming method is a sputtering process or a vacuum deposition process.

The role of the metallic underlayer is to promote crystalline growth of the ferromagnetic metallic layer so that, when the ferromagnetic metallic layer having a Co group is formed on the Cr layer, the magnetic easy axis of the ferromagnetic metallic layer takes the substrate body in-plane direction, that is, so that a coercive force in the substrate body in-plane direction becomes high.

When the Cr metallic underlayer is formed by the sputtering process, the film forming factors for controlling its crystallization include substrate body surface configuration, surface condition, surface temperature, gas pressure at the time of forming the film, a bias to be applied to the substrate body, and a film thickness to be formed. In particular, since the coercive force of the ferromagnetic metallic layer tends to become high in proportion to the thickness of the Cr film, the Cr film thickness was set to be in a range of 50 to 150 nm in the prior art.

In this connection, the prior art film forming conditions (film forming conditions in the present invention) are that a film formation chamber has a back pressure of the order of $10^{-7}$ ($10^{-9}$) Torr and an Ar gas used in the film formation has an impurity concentration of 1 ppm or less (not larger than 100 ppt and preferably not larger than 10 ppb). A target used at the time of forming the metallic underlayer has an impurity concentration of preferably 150 ppm or less.

For the purpose of improving the recording density, it is necessary to make small the magnetic-head flying height from the surface of the head medium. Meanwhile, as the Cr film thickness increases, the surface roughness of the medium tends to be increased. Accordingly, it has been demanded to realize a high coercive force with a small Cr film thickness.

Ferromagnetic metallic layers usable in the present invention include two types.

The first type of ferromagnetic metallic layer is employed, when the ferromagnetic metallic layer is formed on the substrate body via the metallic underlayer (that is, in the case of a magnetic film for longitudinal recording), and is made of, for example, CoNiCr, CoCrTa, CoCrPt, CoNiPt, CoNiCrTa, or CoCrPtTa.

In this case, the prior art film forming conditions (film forming conditions in the present invention) are that a film formation chamber has a back pressure of the order of $10^{-7}$ ($10^{-9}$) Torr and an Ar gas used in the film formation has an impurity concentration of 1 ppm or less (not larger than 100 ppt and preferably not larger than 10 ppb). A target used at the time of forming the ferromagnetic metallic layer has an impurity concentration of preferably 30 ppm or less.

Of the first type of ferromagnetic metallic layers; the CoNiCr ferromagnetic metallic layer is suitably employed because it is inexpensive and less influenced by the film forming atmosphere, the CoCrTa ferromagnetic metallic layer is suitably employed because it produces a low media noise, and the CoPt-series ferromagnetic metallic layer is suitably employed because it allows realization of a coercive force of 1800 Oe which cannot be obtained by the CoNiCr or CoCrTa ferromagnetic metallic layer.

Problems or objects with the first type are, in order to improve the recording density and lower the manufacturing costs, to develop such a material that can realize a high coercive force with inexpensive material cost and low media noise and also to develop its manufacturing method.

The second type of ferromagnetic metallic layer is suitably employed, when the ferromagnetic metallic layer is formed directly on the substrate body without any intervention of the metallic underlayer (that is, in the case of the magnetic film for vertical recording), and is made of, for example, CoCr, CoPt, or CoCrTa. Further, a soft magnetic metallic layer may be provided as a backing layer in some cases under the ferromagnetic metallic layer.

Problems or objects with the second type are to develop such a material that can keep a high coercive force in a direction perpendicular to the film surface even when the ferromagnetic metallic layer is made thin and also to develop its manufacturing method.

There are two types of "magnetic recording medium using magnetic inversion" in accordance with the present invention, that is, the medium for performing magnetic recording parallel to the surface of the aforementioned ferromagnetic metallic layer (longitudinal magnetic recording medium) and the medium for performing magnetic recording vertical thereto (vertical magnetic recording medium).

In either medium, in order to improve its recording density, it is necessary to further minimize the recorded magnetization. Since this minimization also causes reduction of leakage magnetic flux for each magnetic recording, a reproduction output signal from the magnetic head also becomes small. Accordingly, it has been demanded to further reduce media noise that is considered to be generated due to the recorded magnetization.

For example, in the case of the CoNiCr film formed by the prior art sputtering process, it has been already found that "oxygen concentration of the ferromagnetic metallic layer" in the present invention is 250 wt ppm or more. The influences have been examined regarding oxygen concentration of the ferromagnetic metallic layer, that is, the influences of coercive force or media noise on the medium.

The aforementioned prior art sputtering process means to be used to form the film under conditions that the film formation chamber for formation of the ferromagnetic metallic layer has an inner pressure of $10^{-7}$ Torr and and Ar gas used at the time of forming the ferromagnetic metallic layer has an impurity concentration of 1 ppm or more.

For example, in the case of the Cr film formed by the prior art sputtering process, it has been already found that oxygen concentration of the metallic underlayer in the present invention is 250 wt ppm or more. The influences of oxygen concentration of the metallic underlayer have been examined, that is, the influences of the metallic underlayer on crystalline growth process dependent on the thickness of the metallic underlayer and the influences of the metallic underlayer on the ferromagnetic metallic layer formed thereon.

The aforementioned prior art sputtering process has the same meaning as the explanation of the above item regarding the oxygen concentration of the ferromagnetic metallic layer.

"Normalized Coercive Force Of Ferromagnetic Metallic Layer" in the present invention is a division of coercive force Hc by an anisotropic magnetic field $Hk^{gran}$ of crystalline grains and means a degree of enhancement in the magnetic isolation of crystal grains, which is explained in "Magnetization Reversal Mechanism Evaluated by Rotational hysteresis Loss Analysis for the Thin Film Media", Migaku Takahashi, T. Shimatsu, M. Suekane, M. Miyamura, K. Yamaguchi, and H. Yamasaki:, IEEE TRANSACTIONS ON MAGNETICS, VOL. 28 1992, pp. 3285.

The normalized coercive force of the ferromagnetic metallic layer formed by the prior art sputtering process had a value smaller than 0.3 so long as the ferromagnetic metallic layer contains a Co group. As already known, according to Stoner-Wohlfarth theory, when a crystal grain is magnetically completely isolated, the normalized coercive force takes 0.5 as its upper maximum.

Also disclosed in J.-G. Zhu and H. N. Bertram: Journal of Applied Physics, VOL. 63, 1988, pp. 3248 is that the high normalized coercive force of the ferromagnetic metallic layer means that magnetical interaction between the respective crystal grains of the ferromagnetic metallic layer can be reduced and a high coercive force can be realized.

In this connection, the coercive force Hc means an anti-magnetized force of the medium found from a magnetization curve measured with use of a variable sample magnetometer (abbreviated to VSM). The anisotropic magnetic field $Hk^{grain}$ of crystalline grains is an application magnetic field by which the rotational hysteresis loss measured with use of a high-sensitive torque magnetometer is completely extinguished. The coercive force and anisotropic magnetic field have both values measured in the thin-film plane in the case of the magnetic recording medium having the substrate body and the ferromagnetic metallic layer formed thereon through the metallic underlayer; while they have both values measured in a direction perpendicular to the thin-film plane in the case of the magnetic recording medium having the substrate body and the ferromagnetic metallic layer formed thereon.

Aluminum alloys usable in the present invention include, for example, an alloy containing aluminum and magnesium. The substrate body made of the aluminum alloy is most often used for a hard disk (HD) at the present time. Since its use is for magnetic recording, it is preferable that the aluminum alloy contains reduced amounts of metallic oxides.

Further in many cases, a nonmagnetic (Ni-P) film is formed on the aluminum alloy layer by a plating or sputtering process. This is for the purpose of improving its corrosion resistance and increasing the surface hardness of the substrate body. In order to reduce a frictional force generated when the magnetic head is slid on the medium, the (Ni-P) film is formed thereon with concentric circular fine scars (texture).

Problems or objects with the use of the aluminum alloy substrate body are to make them thin and to reduce the surface roughness of the substrate bodies are about 0.5 mm and about 0.5 nm as their limits.

Glass sheets usable in the present invention include, for example, a glass sheet subjected thereon to an ion doping process for reinforcement and such a glass sheet that in turn has a finely crystallized structure. For the both glass sheets, some steps are taken to eliminate the inherent shortcomings of easily broken or fragile glass.

Glass is advantageous in that the need for provision of the (Ni-P) film or the like can be eliminated because glass is higher in surface hardness than aluminum alloy, and also advantageous from the viewpoints of reduction of the thickness of the substrate body, surface smoothness of the substrate body, anti-high-temperature characteristic of the substrate body, etc.

However, for the purpose of forming a magnetic film having a high coercive force, it is desirable to form the film while keeping high the surface temperature of the substrate body and applying a bias voltage to the substrate body. For this reason, in some cases, a nonmagnetic layer is formed on the glass sheet. Further, in order to prevent invasion of harmful elements from the glass into the magnetic film, such a nonmagnetic layer is sometimes provided. Further, in order to reduce a frictional force generated when the magnetic head is slid on the medium, the glass layer is sometimes formed thereon with a nonmagnetic layer having a fine rough configuration.

Problems or objects with the use of the glass substrate body are both to reduce the thickness of the substrate body and to develop a technique for preventing cracking of the substrate body.

Silicon usable in the present invention is, for example, in the form of a disk-shaped silicon wafer that has a proven track record in the semiconductor field.

Silicon is advantageous over aluminum alloy in that, like glass, silicon is higher in surface hardness than aluminum alloy, and is also advantageous from the viewpoints of feasible reduction of the thickness of the substrate body, surface smoothness of the substrate body, anti-high-temperature characteristic of the substrate body, etc. In addition, it is to be expected that, since the crystallographic orientation on the substrate body surface and lattice constant can be selected for silicon, controllability of the crystal grains of the magnetic film to be formed on the silicon layer will be improved. Further, like aluminum alloy, silicon is advantageous from the viewpoints of the fact that it is possible to apply a bias voltage because the substrate body is electrically conductive and of the fact that more cleaning of a film forming space can be realized because gas, such as $H_2O$, is less frequently emitted from the interior of the substrate body.

Problems or objects with use of the silicon substrate body are, like glass, both to reduce the thickness of the substrate body and to develop a technique for preventing cracking of the substrate body.

Sputtering processes usable in the present invention include, for example, a transportation type sputtering process in which a thin film is formed while the substrate body is moved in from of the target and a stationary type sputtering process in which a thin film is formed with the substrate body fixed in front of the target. The former sputtering process is advantageous in manufacturing a medium with low costs because of its high mass productivity, while the latter sputtering process can manufacture a medium which is excellent in its record/reproduction characteristics because an incident angle of sputtering particles with respect to the substrate body is stable.

The "sequential formation of the metallic underlayer and ferromagnetic metallic layer" in the present invention means that after the metallic underlayer is formed on the substrate body, the metallic underlayer will not be exposed to a pressure atmosphere higher than a gas pressure at the time of the layer formation before the ferromagnetic metallic layer on the metallic underlayer causes remarkable reduction of the coercive force of the medium (for example, 1500 Oe when exposed and 500 Oe or less when not exposed).

The impurities in an Ar gas for film formation include, for example, $H_2O$, $O_2$, $CO_2$, $H_2$, $N_2$, $C_xH_y$, H, C, O, and CO. In particular, it is estimated that impurities which affect the amount of oxygen to be trapped into the film are $H_2O$, $O_2$, $CO_2$, O, and CO. Accordingly, the impurity concentration in the present invention is expressed in terms of a sum of $H_2O$, $O_2$, $CO_2$, O, and CO contained int he Ar gas used for the film formation.

Cleaning by an RF sputtering process in the present invention, there is enumerated, for example, a technique for applying an A.C. voltage from a radio frequency (RF) (such as a 13.56 MHz) power source to the substrate body place with a dischargeable gas pressure atmosphere. The technique is featured in that this can be applied even when the substrate body is not electrically conductive. In general, the effect of the cleaning is, e.g., an improvement in the adhesion of the thin film to the substrate body. However, most of the influence of the thin film formed on the substrate body upon the film material after cleaning are unclear.

The impurities in a Cr target used for formation of the metallic underlayer in the present invention include, for example, Fe, Si, Al, C, O, N, and H. In particular, it is estimated that one of the impurities which affect the amount of oxygen to be trapped into the film is $O_2$. Accordingly, the impurity concentration of oxygen contained in the Cr target used at the time of forming the metallic underlayer.

The impurities in the target used for formation of the ferromagnetic metallic layer in the present invention include, for example, Fe, Si, Al, C, O, and N. In particular, it is estimated that one of the impurities which affect the amount of oxygen to be trapped into the film is $O_2$. Accordingly, the impurity concentration in the present invention refers to a concentration of oxygen contained in the Cr target used at the time of forming the ferromagnetic metallic layer.

The application of a negative bias voltage to the substrate body in the present invention refers to application of a D.C. bias voltage to the substrate body at the time of forming a Cr underlayer and a magnetic film which forms the magnetic recording medium. It has been already known that application of a suitable bias voltage causes increase of coercive force of the medium. It is known that the effect by the above bias voltage application to both of the two layers is much greater than the effect by the bias voltage application to either one of the layers.

However, the bias voltage application often also affects such objects located in the vicinity of the substrate body as a substrate body supporting member and a substrate body holder. This causes generation of gas or dust in a space near the substrate body, which disadvantageously leads to the fact that such gas or dust is entrapped into the thin film being formed and thus film characteristics become unstable.

Further, the bias voltage application to the substrate body also involves problems such as:

1. This bias voltage application cannot be applied to such nonconductive substrate body as a glass substrate body;
2. This voltage application causes reduction of saturation magnetic flux density (Ms) of the formed magnetic film;
3. It is necessary to provide a complex mechanism within the film formation chamber; and
4. The voltage application to the substrate body tends to vary, thus resulting in variations in the magnetic characteristics.

Therefore, there is a demand for a method of manufacturing a medium which has desired film characteristics even when the above voltage application is not carried out.

The vacuum pressures in the film formation chambers for formation of the metallic underlayer and/or ferromagnetic metallic layer in the present invention are film forming factors which determine the value of the coercive force. In particular, it has been conventionally considered that, in the case where the ferromagnetic metallic layer contains a Co group including Ta, when the aforementioned vacuum pressure levels are as low as (e.g., $5 \times 10^{-6}$ Torr or more), such pressure greatly affects the force created. However, in the present invention, it has been found that, even when the ferromagnetic metallic layer is made of CoNiCr or CoCrPt as the Co group material not containing Ta, the vacuum pressure levels of the film formation chambers will work, from the viewpoint of whether or not a grain boundary layer of amorphous structure between crystalline grains can be formed.

The surface temperature of the substrate body at the time of forming metallic underlayer and/or ferromagnetic metallic layer in the present invention is one of the film forming factors which is independent of the material of the ferromagnetic metallic layer and which determines the value of coercive force. In such a temperature range as not to damage the substrate body, film formation at a higher surface temperature can produce a higher coercive force. The damage of the substrate body refers to such external change as warpage, swelling, or cracking, or such internal change as generation of magnetization or an increased amount of generated gas.

For the purpose of realizing a high substrate body surface temperature, however, it is generally necessary to perform some heating treatment in the film formation chamber or its front chamber. The heating treatment disadvantageously involves generation of gas or dust in a space near the substrate body, which gas or dust is entrapped into the thin film being formed and thus the film characteristics become unstable.

Further, the high surface temperature of a substrate body also involves problems such as:

1. A nonmagnetic NiP layer in an NiP/Al substrate body is magnetized;
2. Distortion is generated in the substrate body; and
3. For a substrate body having a low thermal conductivity such as a glass substrate body, it is difficult to raise or keep the substrate body temperature.

Therefore, there is a demand for a method for forming a film having desired film characteristics without performance of the above heating treatment or with only low-temperature heating treatment.

As the substrate body surface roughness in the present invention, there is enumerated an average roughness factor Ra when the surface of the substrate body having, e.g., a disk shape is measured in a radical direction. The measuring device used in this case was a TALYSTEP manufactured by the RANKTAYLORHOBSON company.

When the rotation of the substrate body is started or stopped, the magnetic recording medium and magnetic head are brought into contact and sliding engagement with each other (which is known as contact start and stop (CSS)).

In this case, in order to suppress the sticking of the magnetic head and the increase of the friction coefficient, it is preferable have a large average roughness factor Ra. Meanwhile, when the substrate body reaches its maximum rotational speed, it is necessary to secure a spacing between the magnetic recording medium and magnetic head, that is, a magnetic-head flying height, for which reason it is desirable to have a small average roughness factor Ra.

Accordingly, the surface roughness of a substrate body and the maximum and minimum of Ra are suitably determined for the aforementioned reason and according to specifications required for the magnetic recording medium. For example, the magnetic-head flying height of the magnetic head is 2 μin., Ra is between 6 nm and 8 nm.

In order to obtain a higher recording density, however, it is necessary to make smaller the head flying height (spacing between the surface of the magnetic recording medium and the magnetic head apart therefrom). In order to satisfy such a demand, it is important to make more flat the surface of the magnetic recording medium. For this reason, it is desirable to have a smaller substrate body surface roughness.

Accordingly, even when the surface roughness of the substrate body is small, there is a demand for a method for forming films having desired film characteristics.

For the texturing in the present invention, there is enumerated, for example, a mechanical polishing process, a chemical etching process or a process for physically applying an uneven surface to a film. In particular, when the most widely used aluminum substrate body is employed as the substrate body of the magnetic recording medium, the mechanical polishing process is used. For example, by pushing a tape having grinding abrasive grains bonded on its surface against the (Ni-P) film provided on the surface of the aluminum alloy substrate body, concentric circular fine scars are applied thereto. This method may be, in some cases, carried out with the grinding abrasive grains liberated from the tape.

However, for such a reason as mentioned in the above item regarding the substrate body surface roughness, there is a demand for a method for forming a film having desired film characteristics when the above texturing is not carried out or even when finer texturing is called for.

For the composite electrolytic polishing processing in the present invention, there is enumerated, for example, a process for providing an oxidization passivity film of chromium oxide as a product on an inner wall of a vacuum chamber for formation of the magnetic film, etc. In this case, the material forming the inner wall of the vacuum chamber is preferably, e.g., SUS316L or the like. Since this process enables reduction of the amounts of $O_2$ and $H_2O$ emitted from the inner wall of the vacuum chamber, the amount of oxygen trapped into the formed thin film can further be reduced.

In the magnetron sputtering apparatus (manufactured by the ANELBA Co. Ltd., model type: ILC3013 of load-lock style stationary opposition type), inner walls of all the vacuum chambers (load/unload chambers, film formation chambers and cleaning chamber) are previously subjected to the aforementioned process.

EXPLANATION OF REFERENCE NUMERALS 1 substrate body
2 Al substrate body
3 nonmagnetic (Ni-P) layer
4 Cr underlayer
5 ferromagnetic metallic layer
6 protective layer
11 Si substrate body
12 α-rich layer
13 β-rich layer
14 Cr underlayer
15 ferromagnetic metallic layer Although the present invention will be explained in detail below in the connection with preferred embodiments, the present invention is not restricted to the specific embodiments.

Embodiment 1

The present embodiment shows effects obtained by disposing an α-rich layer of at least nickel (Ni), phosphorus (P), and oxides thereof, and a β-rich layer containing at least an ester group between a substrate body and a metallic underlayer.

In order to confirm the effects, a Si substrate body (having a surface roughness Ra of 0.5 nm) was used as the substrate body and examination was carried out for media in which no layer is disposed (condition 1), the α-rich layer alone is disposed (condition 2), and both of the α-rich layer and β-rich layer are disposed (condition 3), between the substrate body and metallic underlayer. Further, examination was carried out for a medium using a Si substrate body (having a large surface roughness Ra of 15 nm) only under the condition 3 (condition 4).

In this connection, a vacuum pressure level in a film formation chamber for formation of the α-rich layer and β-rich layer therein was fixed at about the order of $10^{-9}$ Torr, the α-rich layer was set to have a fixed thickness of 3 nm, and the β-rich layer was set to have a fixed thickness of 5 nm.

As has already been explained above, conditions for formation of the metallic underlayer and ferromagnetic metallic layer were all fixed.

FIG. 1 is a schematic view of an example of a magnetic recording medium in the case of the above condition 3 for explaining a hard disk. FIG. 1(a) is a general perspective view of the magnetic recording medium and FIG. 1(b) is a cross-sectional view of FIG. 1(a) taken along line A–A'.

A substrate body 11 comprises a Si substrate body subjected thereon to a texture treatment or texturing. Formed on the substrate body 11 are an α-rich layer 12, a β-rich layer 13, a Cr underlayer 14, and a ferromagnetic metallic layer 15. In the present example, no protective layer was provided on the ferromagnetic metallic layer 15, which is because provision of the protective layer causes influence on the above effects.

Explanation will next be made as to a method of manufacturing a magnetic recording medium of FIG. 1 in the case of the condition 3. It is assumed prior to the next steps, as in the above, that the α-rich layer and β-rich layer are both not formed under the condition 1, that the β-rich layer is not formed under the condition 2 and that the condition 4 is the same as the condition 3 except that a substrate body having a large surface roughness is used.

Explanation will first be made as to a first step of forming the α-rich layer and β-rich layer on the substrate body. After subjected to the present step, the substrate body will be moved via a buffer chamber having an inner vacuum pressure of the order of $10^{-9}$ Torr to a film formation chamber 3 (for formation of a metallic underlayer) in a second step to be explained later.

A film formation apparatus used in the first step of the present example includes 3 vacuum chambers, that is, a load/unload chamber (also functioning as a cleaning chamber), a film formation chamber 1 (for formation of the α-rich layer) and a film formation chamber 2 (for formation of the β-rich layer), inner walls of which are all previously subjected to composite electrolytic polishing processing. Table 1 shows film formation condition when the α-rich layer and β-rich layer are formed in the present example.

TABLE 1

| Item | Set Value |
|---|---|
| 1. Substrate body material | Silicon substrate body (Si (100) or Si (111) in its film formation surface) |
| 2. Substrate body diameter and shape | 89 mm Disk |
| 3. Substrate body surface configuration | Textured Ra = 0.5 mm |

TABLE 1-continued

| Item | Set Value |
|---|---|
| 4. Vacuum pressure (Torr) | the order of $10^{-9}$ Torr (for all chambers) |
| 5. Gas increase rate (Torr*1/sec) | $\leq 5 * 10^{-7}$ (for all chambers) |
| <Film formation chamber 1> | |
| 6. Impurity concentration in Ar gas | 10 ppb |
| 7. Impurity concentration in $O_2$ gas | 1 ppm |
| 8. Gas mixture ratio | Ar gas:$O_2$ gas = 9:1 |
| 9. Mixture gas pressure (mTorr) | 2 |
| 10. Sustained temperature of substrate body surface (° C.) | 100 |
| 11. Target material (at %) | $Ni_2P$ |
| 12. Formed film thickness (nm) | 3 |
| <Film formation chamber 2> | |
| 13. Source | gas Aliphatic ester ($C_{12}$–$C_{16}$) |
| 14. Sustained temperature on substrate body surface (° C.) | 100 |
| 15. Exposure time (sec.) | 10 |
| 16. Fabricated film thickness (nm) | 5 |

Explanation will next be sequentially made as to how to form the α-rich layer and β-rich layer in the present example.

Numbers parenthesized in the following denote sequential numbers in the step.

(1) Used as the substrate body was an Si substrate body having inner and outer diameters of 25 mm and 89 mm and having a disk shape with a thickness of 1.27 mm. The Si substrate body was made thereon with fine concentric circular scars (texture) by a technical technique, so that the substrate body had a surface roughness Ra of 0.5 nm when scanned in a disk radial direction.

(2) Prior to film formation to be explained later, the above substrate body was subjected to a mechanical and chemical cleaning technique and to a drying process using hot air or the like.

(3) The substrate body already subjected to the aforementioned drying process was placed in a substrate body holder which is positioned in a charge chamber of a sputtering apparatus and is made of aluminum material. The charge chamber was vacuumized by a vacuum evacuator to an internal pressure of $3 \times 10^{-9}$ Torr, after which the substrate body was subjected to an annealing process for 5 minutes at a temperature of 250° C. with use of an infrared radiation lamp.

(4) The substrate body holder was moved from the charge chamber to the film formation chamber 1 for formation of the α-rich layer. Thereafter, the substrate body was heated to and kept at 100° C. with use of the infrared radiation lamp. In this connection, the film formation chamber 1 wa previously evacuated down to $3 \times 10^{-9}$ Torr. Further, after the substrate body holder was moved, a door valve disposed between the charge chamber and film formation chamber 1 was closed. The $Ni_3P$ target used had an impurity concentration of 1 ppm.

(5) A mixture of gas of an Ar gas and an $O_2$ gas was introduced into the film formation chamber 1 was set at 2 mTorr. An impurity concentration contained in the used Ar gas was fixedly set at 10 ppb and an impurity concentration contained in the $O_2$ gas was fixed set at 1 ppm.

(6) A voltage of 200 W was applied from a D.C. power source to the $Ni_3P$ target was sputtered to form an α-rich layer having a thickness of 3 nm on a surface of the substrate body positioned opposite and parallel to the target.

(7) After the formation of the α-rich layer, the substrate body holder was moved from the film formation chamber 1 to film formation chamber 2 for formation of the β-rich layer. Even after it was moved, the substrate body was heated by the infrared radiation lamp to and kept at 100° C. In this case, the film formation chamber 2 was previously evacuated down to a pressure of $3\times10^{-9}$ Torr. Further, after the substrate body holder was moved, a door valve disposed between the film formation chamber 1 and film formation chamber 2 was closed.

(8) Aliphatic ester ($C_{12}$–$C_{16}$) was ejected onto the surface of the substrate body from a nozzle disposed in the vicinity of the substrate body to thereby form a β-rich layer having a thickness of 5 nm. The thickness was controlled by a time during which the substrate body is exposed to the above gas.

(9) After the formation of the β-rich layer, the substrate body holder was moved from the film formation chamber 2 to the buffer chamber connecting the first and second steps. The moved substrate body was heated by the infrared radiation lamp to and maintained at 250° C. In this connection, the buffer chamber was previously evacuated down to $3\times10^{-9}$ Torr and, after the substrate body holder was moved, a door valve disposed between the film formation chamber 2 and buffer chamber was closed.

Explanation will next be made as to the second step in which the metallic underlayer, ferromagnetic metallic layer and protective layer are formed on a surface of the substrate body after completion of the first step.

A film forming apparatus for use in the second step in the present example is of a magnetron sputtering apparatus (manufactured by the ANEKVA company, product number: ILC3013, load-lock style stationary opposition type), in which the inner wall of all the chambers (a buffer chamber, a film formation chamber 3 (for formation of metallic underlayer), a film formation chamber 4 (for formation of the ferromagnetic metallic layer)) are previously subjected to a composite electrolytic polishing processing. Table 2 shows film forming conditions when the respective layers are formed in the second step of the present example.

TABLE 2

| Item | Set Value |
| --- | --- |
| 1. Vacuum pressure (Torr) | Order of $10^{-9}$ Torr (the same for all chambers) |
| 2. Impurity concentration in Ar gas | 10 ppb (the same for all chambers) |
| 3. Ar gas pressure (mTorr) | 2 (the same for all chambers) |
| 4. Sustained temperature on substrate body (° C.) | 250 (the same for all chambers) |
| 5. Target material (at %) | Cr, $Co_{62.5}Ni_{30}Cr_{7.5}$ |
| 6. Target diameter (inch) | 6 |
| 7. Impurity concentration in target (ppm) | 120 (Cr), 20 (CoNiCr) |
| 8. Interval between target and substrate body (mm) | 35 (Cr, CoNiCr) |
| 9. Power input to target (W) | D.C. 200 (Cr, CoNiCr) |
| 10. D.C. bias applied to substrate body at film formation time (−Volt) | 200 (CR)<br>300 (CoNiCr) |
| 11. Film thickness Formed (nm) | 50 (Cr)<br>40 (CoNiCr) |

Explanation will be made as to the second step of the film formation method according to the procedure, in which numbers parenthesized denote the sequential numbers in the step.

(10) The substrate body holder was moved from the buffer chamber to the film formation chamber 3 for formation of the Cr film. Even after the movement of the substrate body holder, the substrate body was heated by the infrared radiation lamp to and kept at 250° C. In this connection, the film formation chamber 3 was previously evacuated down to a vacuum level of $3\times10^{-9}$ Torr. After the movement of the substrate body holder, a door valve disposed between the buffer chamber and film formation chamber 3 was closed. The Cr target used had an impurity concentration of 120 ppm.

(14) An Ar gas was introduced into the film formation chamber 3 so that the film formation chamber 3 has an inner gas pressure of 2 mTorr. An impurity concentration contained in the used Ar gas was fixedly set at 10 ppb.

(15) A voltage of 200 W was applied for a D.C. power source to the Cr target to generate plasma. As a result, the Cr target was sputtered to form a Cr layer of 50 nm thick on the substrate body at such a location opposite to and parallel to the target.

(16) After the formation of the Cr layer, the substrate body holder was moved from the film formation chamber 3 to the film formation chamber 4 for formation of a CoNiCr film. Even after the holder movement, the substrate body was heated by the infrared radiation lamp to and kept at 250° C. In this case, the film formation chamber 4 was previously evacuated down to a vacuum level of $3\times10^{-9}$ Torr. Further, after the movement of the substrate body holder, a door valve disposed between the film formation chamber 3 and film formation chamber 4 was closed. The used target contained 62.5 at % of Co, 30 at % of Ni, and 7.5 at % of Cr, and had an impurity concentration of 20 ppm.

(17) An Ar gas was introduced into the film formation chamber 4 so that the film formation chamber 4 had an inner gas pressure of 2 mTorr. An impurity concentration contained in the used Ar gas was fixedly set at 10 ppb.

(18) A voltage of 200 W was applied for a D.C. power source to the CoNiCr target to generate plasma. This resulted in that the CoNiCr target sputtered to form a CoNiCr layer of 40 nm thick.

(19) After the formation of the CoNiCr layer, the substrate body holder was moved from the film formation chamber 4 to an unload chamber. Then, the substrate body was unloaded after the pressure was up to the atmospheric pressure by introducing $N_2$ gas in the unload chamber. Thereafter, through the aforementioned steps (1) to (19), there were formed on the Si substrate body an α-rich layer, a β-rich layer, a Cr metallic underlayer, and a CoNiCr ferromagnetic metallic layer, thus manufacturing a magnetic recording medium.

To this time impurities in the target were minimized. Impurities in the target for Cr formation included 88 wt ppm of Fe, 34 wt ppm of Si, 10 wt ppm of Al, 60 wt ppm of C, 120 wt ppm of O, 60 wt ppm of N, and 1.1 wt ppm of H. The target for formation of the ferromagnetic metallic layer contained 29.2 at % of Ni, 7.3 at % of Cr, and the balance of Co. And impurities in the target contained Fe:27 wt ppm, Si<10 wt ppm, Al <10 wt ppm, C:30 wt ppm, 0:20 wt ppm, and N >10 wt ppm.

FIGS. 2 to 5 show results of analysis of composition of the magnetic recording medium by performing $Ar^+$ etching (0.5 kV–10 mA) in a cross-sectional direction of the laminated thin films at intervals of 15 seconds with use of angle resolved X-ray photo spectroscopy (ARXPS). More specifically, FIGS. 2 and 3 show the results of the magnetic recording medium under the condition 3 of the employment of the α-rich layer and β-rich layer. FIG. 3 is an enlargement of FIG. 2 in the vicinity of the stacked α-rich layer and β-rich layer. FIG. 4 is for the magnetic recording medium under condition 2 of the employment of only the α-rich layer. FIG. 5 is for the magnetic recording medium under condition 1 of no provision of both the the α-rich layer and β-rich layer as well as a former medium.

It has been clearly confirmed from FIGS. 2 and 3 that, in the case of condition 3, the α-rich layer is formed on the Si substrate body, the β-rich layer is formed on the α-rich layer and then the Cr layer and the Co alloy layer are sequentially formed on the β-rich layer. It has also been confirmed that, in the case of condition 2 (see FIG. 4), the Cr layer and Co alloy layer are sequentially formed on the Si substrate body via the α-rich layer.

Meanwhile, in the case of condition 4 (when the substrate body is large in its surface roughness), two sorts of sectional profiles corresponding to FIG. 3 and 4 have been locally observed.

FIG. 6 shows results of examination of diffraction intensity of Ni (2p3/2) and P (2p) in the β-rich layer in FIG. 3, and FIG. 7 shows results of examination of diffraction intensity of C (Ls) in the β-rich layer shown in FIG. 3.

It has been found from FIG. 6 that the α-rich layer contains at least nickel (Ni), phosphorus (P), and oxides thereof. Further it has been found from FIG. 7 that the β-rich layer contains at least an ester group (—C(=O)—O—).

Shown in Table 3 are measured results of coercive force of the magnetic recording media under conditions 1 to 4. For each condition, 10 samples were extracted from the disk substrate body and examined also with respect to their variations.

TABLE 3

| Condition | Ra (nm) | α-rich layer | β-rich layer | coercive force (Oe) |
|---|---|---|---|---|
| 1 | 0.5 | Without | Without | 1250–1370 |
| 2 | 0.5 | With | Without | 1430–1640 |
| 3 | 1.5 | With | With | 2250–2400 |
| 4 | 15 | With | With | 1680–2120 |

It has been found from Table 3 that, in the case of conditions 3 and 4, high coercive force is obtained when compared with conditions 1 and 2. It has been judged from this experimental results that the increase in the coercive force results from the provision of the α-rich layer containing at least nickel (Ni), phosphorus (P), and oxides thereof, and the β-rich layer having at least an ester group between the substrate body and metallic underlayer.

It has been found that two-layer separation between the α-rich layer and β-rich layer is clear on the substrate body, the magnetic recording medium of condition 3 prepared without in-plane distribution is higher in coercive force value and smaller in its fluctuation than the magnetic recording medium of condition 4 with the in-plane distribution. It has been judged from this experimental results that, without the in-plane distribution, that is, when the magnetic recording medium has a layer structure of the substrate body, the α-rich layer, β-rich layer, metallic underlayer, and ferromagnetic metallic layer; stable longitudinal magnetic recording can be realized, which is highly preferred.

FIG. 8 shows results of examination of the magnetic recording media of the conditions 1 to 4 based on the thin-film X-ray diffractometry, in which (a) is for the condition 1, (b) is for the condition 2, (c) is for the condition 4, and (d) is for the condition 3.

In the case of condition 1 (in the case of no provision of both of the α-rich layer and β-rich layer), the crystallographic orientations of the metallic underlayer and ferromagnetic metallic layer were Cr (110) and CoNiCr (101). In the case of the condition 2 (in the case of the provision of only the α-rich layer), the crystallographic orientations were changed to Cr (200) and CoNiCr (110).

Meanwhile, in the case of the condition 4 (in the case of the provision of both the α-rich layer and β-rich layer, with the substrate body having a large surface roughness), the crystallographic orientations were substantially the same as those of the condition 2 but its diffraction peak intensity was smaller. Further, in the case of the condition 3 (in the case of the provision of both the α-rich layer and β-rich layer, with the substrate body having a small surface roughness), a diffraction peak weaker than that of condition 4 and corresponding to that of condition 2 and a weak diffraction peak corresponding to that of condition 1 were observed.

It has been judged from the results of conditions 3 and 4 that, when the α-rich layer and β-rich layer are provided between the substrate body and metallic underlayer, the crystals of the ferromagnetic metallic layer tend to be oriented randomly. This tendency became stronger as the surface roughness of the substrate body became smaller. And it has been confirmed that, when the lamination of the α-rich layer and β-rich layer has no in-plane distribution, the coercive force in the in-plane direction takes a maximum value.

In the present example, the vacuum pressure levels of the film formation chambers for formation of the α-rich layer, β-rich layer, metallic underlayer and ferromagnetic metallic layer were all set to be on the order of $10^{-9}$ Torr. The effects of the provision of the α-rich layer and β-rich layer at the inner vacuum pressure levels (of the order of $10^{-7}$ Torr) of the film formation chambers for fabrication of the prior art magnetic recording medium have been confirmed as follow.

(a) When the vacuum pressure levels of the film formation chambers only for formation of the α-rich layer and β-rich layer were set to be on the order of $10^{-7}$ Torr, the amounts of oxygen contained in the respective layers were increased so that the crystallographic orientations of the Cr and CoNiCr films formed on such layers were Cr (110) and CoNiCr (101) that is the same as in condition 1. As a result, the maximum of coercive force was as considerably low as about 1300 Oe.

(b) When the vacuum pressure levels of the film formation chambers only for formation of the metallic underlayer and ferromagnetic metallic layer were set to be on the order of 10–17 Torr, the amounts of oxygen contained in the respective layers exceeded 100 ppm. In this case, the crystallographic orientations of the Cr and CoNiCr films were Cr (200) and CoNiCr (110) that is the same as in the condition 2, and the maximum of coercive force was as low as about 1500 Oe.

(c) When the vacuum pressure levels of the film formation chambers for formation of the α-rich layer, β-rich layer, metallic underlayer and ferromagnetic metallic layer were all set to be on the order of $10^{-8}$ Torr, the crystallographic orientations of the Cr and CoNiCr films were close to those of the condition 4. That is, weak Cr (200) and weak CoNiCr (110) were observed. In this case, coercive force was about 1800 Oe.

It has been found from the experimental results of the above effects (a) to (c) that the lower the vacuum pressure level, the greater the effects of the provision of the α-rich layer and β-rich layer is.

In accordance with the present invention, for the purpose of forming the β-rich layer having an ester group, a gas of isophthalic acid was used as a source gas. However, a gas of any material can be used so long as organic molecules forming the β-rich layer have the ester group. However, it must endure the annealing treatment of forming the metallic underlayer or ferromagnetic metallic layer because it cannot maintain its thin film form. Accordingly, it is necessary that the β-rich layer having the ester group consist of organic molecules having a melting point higher than a substrate body temperature at which the metallic underlayer or ferromagnetic metallic layer is to be formed. Further, it has been judged that the temperature of the substrate body at which the metallic underlayer and/or ferromagnetic metallic layer is to be formed be importantly made lower than the melting point of the organic molecules forming the β-rich layer.

Although the Si substrate has been employed as the substrate body in the present invention, it has been confirmed that any substrate material can be used when the α-rich layer and β-rich layer are employed, because the substrate body function becomes independent of its material. In this connection, it is preferable that the substrate body have an excellent surface flatness, since the effect of the provision of the α-rich layer and β-rich layer becomes the greatest when the substrate body has a small surface roughness. The substrate bodies include, as specific examples, substrate bodies made of aluminum, titanium, alloys thereof, glass, carbon, ceramic, plastic, resin or a composite thereof, and substrate bodies coated thereon with nonmagnetic films of different sorts of materials by a sputtering, vacuum deposition or plating process.

Embodiment 2

The present embodiment 2 is different from embodiment 1 in that a sum (tα+tβ) of the thickness tα of the α-rich layer and the thickness tα of the α-rich layer is varied. Examination was made when the sum (tα+tβ) is varied in a range of 0–25 nm. In this case, a ratio of the thickness tα of the α-rich layer to the thickness tβ of the β-rich layer was fixedly set to be ⅗.

Others conditions were set to be the same as those under the condition 3 of the embodiment 1.

FIG. 9 shows measured results of coercive force of a magnetic recording medium of the present embodiment. It has been seen from FIG. 9 that, when the sum (tα+tβ) is not smaller than 3 nm and not larger than 12 nm, there can be stably manufactured a magnetic recording medium which has a coercive force exceeding 2000 Oe. higher by more than 25% than the prior art medium (where the α-rich layer and β-rich layer are not provided, i.e., corresponding to abscissa of 0).

Embodiment 3

The present embodiment 3 is different from the embodiment 1 in that a ratio (tα/tβ) of the thickness tα of the α-rich layer to the thickness tα of the β-rich layer was varied. Examination was made when the ratio (tα/tβ) is varied in a range of 0–2. In this case, a sum of sum (tα+tβ) of the thickness tα of the α-rich layer and the thickness tβ of the β-rich layer was fixedly set at 8 nm.

Other conditions were substantially the same as those under the condition 1 of the embodiment 1.

FIG. 10 shows measured results of coercive force of a magnetic recording medium of the present embodiment. It has been seen from FIG. 10 that, when the ratio (tα/tβ) is in a range larger than 0 and not larger than 1, there can be stably manufactured a magnetic recording medium which has a coercive force exceeding 2000 Oe and higher by more than 25% than the prior art medium (where the α-rich layer and β-rich layer are not provided, i.e., corresponding to abscissa of 0).

Embodiment 4

Explanation will be made as to the effects of the present embodiment when the α-rich layer containing at least nickel (Ni), phosphorus (P) and oxides thereof as well as the β-rich layer having at least an ester group are provided. The ferromagnetic metallic layer contained 85 at % of Co and 15 at % of Cr.

For the purpose of confirming the effects, examination was made when an Si substrate (having a surface roughness Ra of 0.5 nm) was used as the substrate body and when any layer was not provided as well as a former medium (condition 5), when only the α-rich layer is provided (condition 6) and when both of the α-rich layer and β-rich layer were provided (condition 7) between the substrate body and ferromagnetic metallic layer. Examination was made also even when an Si substrate (having a large surface roughness Ra of 15 nm) was used only at the condition 7 (condition 8).

In this connection, inner vacuum pressure levels of the film formation chambers for formation of the α-rich layer and β-rich layer were set to be on the order of $10^{-9}$ Torr, the α-rich layer and β-rich layer were set to have fixed thicknesses of 3 nm and 5 nm respectively.

Other conditions were substantially the same as those of the embodiment 1.

Table 4 shows examined results of coercive force in a direction perpendicular to the surface of the magnetic recording medium. For each condition, 10 samples were extracted from the disk substrate body and examined with respect to their fluctuations.

TABLE 4

| Condition | Coercive force (Oe) |
| --- | --- |
| 5 | 1600–1650 |
| 6 | 1700–2100 |
| 7 | 2400–2600 |
| 8 | 2050–2300 | like the embodiment 1, the X-ray photo spectroscopy (XPS) was used to analyze the composition of the magnetic recording media of the conditions 5 to 8 in a cross-sectional direction of thin films, which analyzed results were as follows.

(1) In the case of the condition 6, it has been confirmed that a Cr layer and a Co alloy layer are sequentially formed on the Si substrate body through the α-rich layer.

(2) In the case of the condition 7, it has been clearly confirmed that the α-rich layer is formed on the Si substrate body, the β-rich layer is formed on the α-rich layer, and the Cr and Co alloy layers are sequentially formed on the β-rich layer.

(3) In the case of the condition 8 (when the surface roughness of the substrate body is large), two sorts of sectional profiles corresponding to the conditions 6 and 7 were locally observed.

As a result of examining diffraction intensity of Ni (2p3/2) and P (2p) for the α-rich layer of the condition 7, peaks resulting from nickel (Ni), phosphorus (P) and oxides thereof were observed. As a result of examining diffraction intensity of C (ls) for the β-rich layer of the condition 7, a peak resulting from the ester group (—C (=O) —O—) was observed.

It has been seen from Table 4 that, in the case of the conditions 7 and 8, a coercive force is higher than that of the conditions 5 and 6. It has been judged from the experimental results that the increase in the coercive force results from the provision of the α-rich layer containing at least nickel (Ni), phosphorus (P) and oxides thereof as well as the β-rich layer having at least a ester group between the substrate body and ferromagnetic metallic layer. It has also been seen that two-layer separation is clear between the α-rich layer and β-rich layer, the magnetic recording medium of the condition 7 manufactured without the in-plane distribution is higher in coercive force than that of the magnetic recording medium of the condition 8 with the in-plane distribution and their variations are smaller. It has been judged from the experimental results that, when no in-plane distribution is provided, that is, when the magnetic recording medium has layer structure of the substrate body, α-rich layer, β-rich layer and ferromagnetic metallic layer, stable vertical magnetic recording can be realized, which is preferable.

In accordance with the present invention, there can be provided a magnetic recording medium which is stably high in coercive force independently of the material of the substrate body by employing the α-rich layer and β-rich layer.

In accordance with the present invention, further, there can be provided a method for easily manufacturing a magnetic recording medium which has a ferromagnetic metallic layer high in coercive force by stably forming a α-rich layer and a β-rich layer.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A magnetic recording medium comprising:

a substrate body having a surface;

a ferromagnetic metallic layer made of Co alloy formed on said surface via a metallic underlayer made of Cr where at least one of said ferromagnetic metallic layer and said metallic underlayer has an oxygen concentration of 100 wt. ppm or less;

an α-rich layer of at least nickel, phosphorus or an oxide thereof; and a β-rich layer having at least an ester group, said α-rich layer and said β-layer disposed between said substrate body and said metallic underlayer.

2. The magnetic recording medium of claim 1 in which magnetic recording medium has a layer structure, of in order: said substrate body, said α-rich layer, said β-rich layer, said metallic underlayer, and said ferromagnetic metallic layer.

3. The magnetic recording medium of claim 1 in which said β-rich layer comprises organic molecules having a melting point higher than a temperature of said substrate body at which said metallic underlayer and said ferromagnetic metallic layer are formed.

4. The magnetic recording medium of claim 1 in which that the sum (tα+tβ) of a thickness tα of said α-rich layer and a thickness tβ of said β-rich layer satisfies the relationship 3 nm≦(tα+tβ)≦12 nm.

5. The magnetic recording medium of claim 1 in which that the ratio (tα/tβ) of a thickness tα of said α-rich layer to the thickness tβ of said β-rich layer satisfies the relationship 0<(tα/tβ)≦1.

6. A magnetic recording medium comprising:

a substrate body having a surface;

a ferromagnetic metallic layer made of Co alloy formed on said surface via a metallic underlayer made of Cr where said ferromagnetic metallic layer has an oxygen concentration of 100 wt. ppm or less;

an α-rich layer of at least nickel, phosphorus or an oxide thereof; and a β-rich layer having at least an ester group, said α-rich layer and said β-layer disposed between said substrate body and said ferromagnetic metallic layer.

7. The magnetic recording medium of claim 6 in which magnetic recording medium has a layer structure, of in order: said substrate body, said α-rich layer, said β-rich layer, and said ferromagnetic metallic layer.

8. The magnetic recording medium of claim 6 in which that the sum (tα+tβ) of a thickness tα of said α-rich layer and a thickness tα of said β-rich layer satisfies the relationship 3 nm≦(tα+tβ)≦12 nm.

9. The magnetic recording medium of claim 6 in which that the ratio (tα/tβ) of a thickness tα of said α-rich layer to the thickness tβ of said β-rich layer satisfies the relationship 0<(tα/tβ)≦1.

10. The magnetic recording medium of claim 6 in which said β-rich layer comprises organic molecules having a melting point higher than a temperature of said substrate body at which said ferromagnetic metallic layer is formed.

11. The method of manufacturing a magnetic recording medium as set forth in claim 1 in which said layers are formed in film formation chambers and vacuum pressure levels of said film formation chambers for formation of said α-rich layer, said β-rich layer, said metallic underlayer, and said ferromagnetic metallic layer are on the order of $10^{-9}$ Torr.

12. The method of manufacturing a magnetic recording medium as set forth in claim 11 in which said substrate body temperature at which one of said metallic underlayer and said ferromagnetic metallic layer is formed, is lower than a melting point of said esters in said β-rich layer.

* * * * *